(12) United States Patent
Holle et al.

(10) Patent No.: US 10,294,427 B2
(45) Date of Patent: May 21, 2019

(54) REACTIVE CATALYTIC FAST PYROLYSIS PROCESS AND SYSTEM

(71) Applicant: Research Triangle Institute, Research Triangle Park, NC (US)

(72) Inventors: Matthew Von Holle, Apex, NC (US); John R. Carpenter, Apex, NC (US); David C. Dayton, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 228 days.

(21) Appl. No.: 15/021,507

(22) PCT Filed: Sep. 11, 2014

(86) PCT No.: PCT/US2014/055166
§ 371 (c)(1),
(2) Date: Mar. 11, 2016

(87) PCT Pub. No.: WO2015/038754
PCT Pub. Date: Mar. 19, 2015

(65) Prior Publication Data
US 2016/0222298 A1    Aug. 4, 2016

Related U.S. Application Data

(60) Provisional application No. 61/876,623, filed on Sep. 11, 2013.

(51) Int. Cl.
*C10B 53/02* (2006.01)
*C10B 49/16* (2006.01)
(Continued)

(52) U.S. Cl.
CPC .............. *C10B 53/02* (2013.01); *C10B 49/10* (2013.01); *C10B 49/16* (2013.01); *C10B 57/06* (2013.01);
(Continued)

(58) Field of Classification Search
CPC ......... C10B 49/10; C10B 49/16; C10B 53/02; C10B 57/06; C10L 1/02; C10G 1/06; C10G 1/08; C10C 5/00
See application file for complete search history.

(56) References Cited

U.S. PATENT DOCUMENTS

| | | | |
|---|---|---|---|
| 2010/0228062 A1 | 9/2010 | Babicki et al. | |
| 2011/0201855 A1* | 8/2011 | Marinangeli | C10G 3/44 585/240 |

(Continued)

FOREIGN PATENT DOCUMENTS

| | | |
|---|---|---|
| CN | 101273114 A | 9/2008 |
| CN | 101735844 A | 6/2010 |

(Continued)

OTHER PUBLICATIONS

Australian Examination Report dated May 2, 2017 from related Australian Application No. 2014318759.
(Continued)

*Primary Examiner* — Brian A McCaig
(74) *Attorney, Agent, or Firm* — Olive Law Group, PLLC

(57) ABSTRACT

This invention is directed to the discovery of a reactive catalytic fast pyrolysis (RCFP) process utilizing hydrogen at low pressures.

19 Claims, 6 Drawing Sheets

Figure 1:
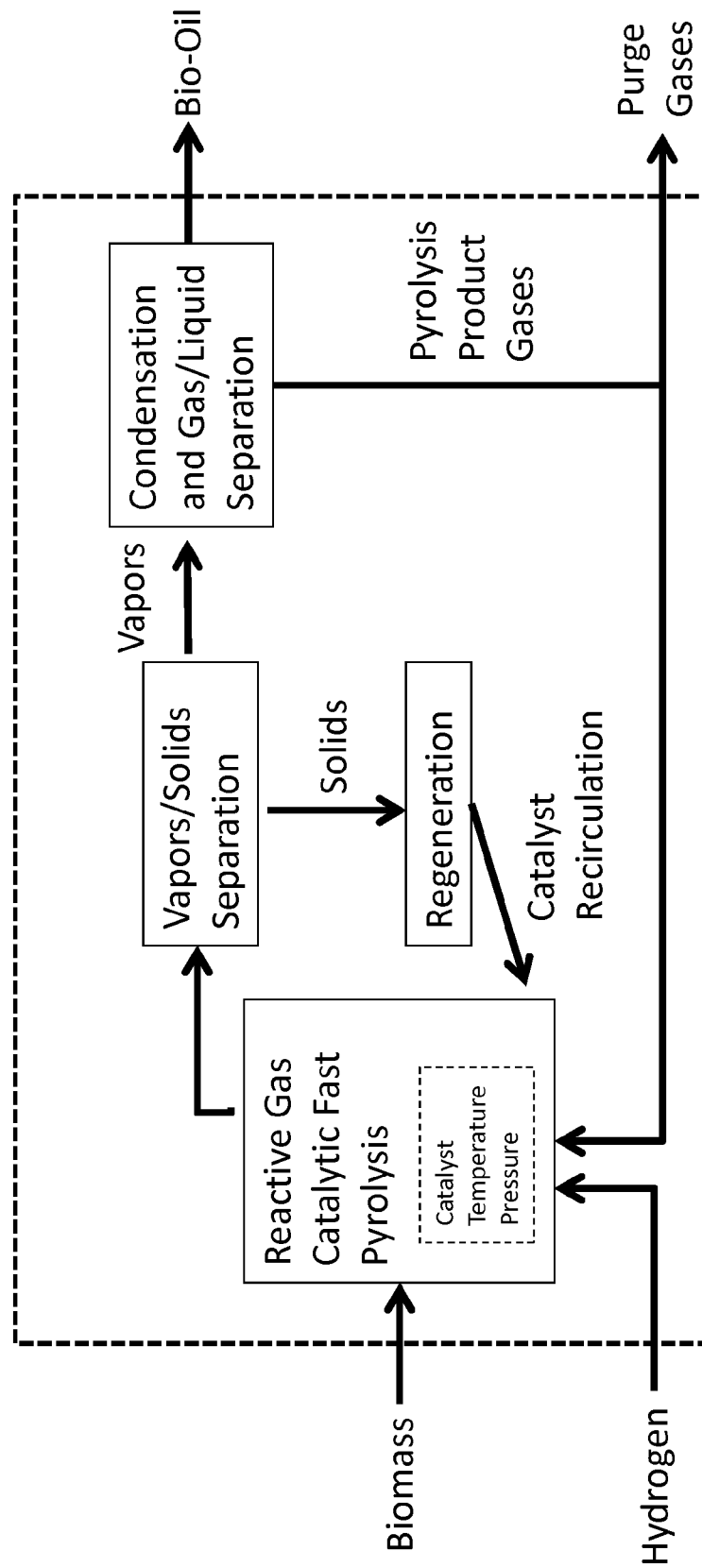

(51) Int. Cl.

| | |
|---|---|
| *C10L 1/02* | (2006.01) |
| *C10C 5/00* | (2006.01) |
| *C10B 57/06* | (2006.01) |
| *C10B 49/10* | (2006.01) |
| *C10G 1/06* | (2006.01) |
| *C10G 1/08* | (2006.01) |

(52) U.S. Cl.
CPC .............. *C10C 5/00* (2013.01); *C10G 1/06* (2013.01); *C10G 1/08* (2013.01); *C10L 1/02* (2013.01); *Y02E 50/13* (2013.01); *Y02E 50/14* (2013.01); *Y02E 50/30* (2013.01); *Y02E 50/32* (2013.01); *Y02T 50/678* (2013.01)

(56) References Cited

U.S. PATENT DOCUMENTS

| | | |
|---|---|---|
| 2012/0094879 A1 | 4/2012 | Roberts et al. |
| 2013/0144089 A1 | 6/2013 | Fjare et al. |

FOREIGN PATENT DOCUMENTS

| | | |
|---|---|---|
| CN | 102341485 A | 2/2012 |
| CN | 102459518 A | 5/2012 |
| CN | 103038321 A | 4/2013 |
| CN | 103237868 A | 8/2013 |
| DE | 3807272 A1 | 9/1989 |
| FR | 2900659 A1 | 11/2007 |
| WO | 2010088486 A1 | 8/2010 |

OTHER PUBLICATIONS

Lappas A et al.; "Biomass pyrolysis in a circulating fluid bed reactor for the production of fuelsand chemicals", Fuel, IPC Science and Tecnology Press, Guildford, GB; Jan. 1, 2002; vol. 81 No. 16; pp. 2087-2095.
International Search Report and Written Opinion dated Dec. 8, 2014 from related International Application No. PCT/US2014/055166.
Second Chinese Office action dated May 15, 2017 from related Chinese Application No. 201480049499.3 with English translation.
Chinese Office action dated Oct. 9, 2016 from related Chinese Application No. 201480049499.3 (translation from foreign associate King Guard IP Law Firm).
Australian Notice of Acceptance for Patent Application issued in counterpart AU Application No. 2014318759 dated Apr. 12, 2018.
Chinese-language Office Action issued in counterpart CN Application No. 201480049499.3 dated Dec. 27, 2017 with English translation (six (6) pages).
European Office Action issued in counterpart EP Application No. 14781335.6 dated Dec. 6, 2017 (five (5) pages).
Bridgwater, A.V., "Review of fast pyrolysis of biomass and product upgrading". Biomass and Bioenergy 38 (2012) 68-94.
Liu, Changjun et al. "Catalytic fast pyrolysis of lignocellulosic biomass". Royal Society of Chemistry 43 (2014) 7594-7623 Published May 7, 2014.
Mohan, Dinesh et al. "Pyrolysis of Wood/Biomass of Bio-oil: A Critical Review". Energy & Fuels 2006, 20, 848-889.
Australian Notice of Grant for Patent issued in counterpart AU Patent No. 2014318759 dated Aug. 9, 2018.
Indian Examination Report issued in counterpart IN Application No. 201617006061 dated Dec. 21, 2018 (five (5) pages).

* cited by examiner

REACTIVE CATALYTIC FAST PYROLYSIS PROCESS AND SYSTEM

CROSS REFERENCE TO RELATED APPLICATIONS

This application is a § 371 U.S. National Stage of International Application PCT/US14/55166, filed Sep. 11, 2014, which claims the benefit of 61/876,623 filed Sep. 11, 2013, Von Holle et al., RTI13003usv which are hereby incorporated by reference in their entireties.

1. FIELD OF THE INVENTION

This invention relates generally to the discovery of a reactive catalytic fast pyrolysis (RCFP) process utilizing hydrogen at low pressures.

2. BACKGROUND OF THE INVENTION

2.1. Introduction

A variety of pyrolysis technologies are being investigated for producing liquid intermediates from biomass that can be upgraded into hydrocarbon fuels. Traditional biomass flash pyrolysis processes have demonstrated a roughly 70% liquid product yield; however, this pyrolysis oil product has limited use without significant stabilization and upgrading. Unfortunately, the physical and chemical properties of fast biomass pyrolysis oils make them unsuitable for integrating into existing petroleum refineries. Undesired properties of conventional pyrolysis oil include 1) thermal instability and high fouling tendency; 2) corrosiveness due to high organic acid content (pH 2.2 to 2.4, typically); 3) immiscibility with refinery feedstocks due to high water and oxygenates content; and 4) metals (K, Na, and Ca) and nitrogen content, which foul or deactivate refinery catalysts.

KiOR Technology (e.g., PCT Publ. No. WO 2011/096912, O'Conner et al.) focuses on a biomass pretreatment process that produces a composite material that is a blend of finely ground biomass reacted with a solid base catalyst, like clay or hydrotalcite, at 200 to 350° C. They disclose the following: (i) Pretreatment Options; (ii) A moderate temperature torrefaction step (roasting or toasting) to dry the material and grind it before it is mixed with the solid base catalyst; (iii) Soaking the biomass in an alkali carbonate aqueous solution to impart inorganic base catalyst into the biomass; (iv) Biomass catalytic cracking (BCC) is an acid catalyzed cracking and deoxygenation process at 350° C. to 400° C.; (v) Fast fluidized or entrained bed reactor; or a transport reactor, much like fluid catalytic cracking; (vi) Regenerate catalyst at temperatures up to 800° C. to remove coke and provide process heat; (vii) Resulting biocrude is upgraded to gasoline and diesel and the char and coke by-products are oxidized for process heat.

U.S. Pat. Publ. No. 2009/0227823 (Huber et al.) described catalytic pyrolysis using zeolites that are unpromoted or are promoted with metals. The pyrolysis was carried out at a temperature of 500 to 600° C. and a pressure of 1 to 4 atm (approximately 101 to 405 KPa) to produce a highly aromatic product with apparent high coke yields and low liquid yields.

PCT Publ. No. WO 2009/018531 (Agblevor) described the use of catalytic pyrolysis to selectively convert the cellulose and hemicellulose fractions of biomass to light gases and leave behind pyrolytic lignin. The methods used H-ZSM-5 and sulfated zirconia catalysts in a fluidized bed reactor to obtain an overall bio-oil yield of 18-21%.

GTI's IH2 process (hydropyrolysis followed by hydroconversion then C1-C4 gas reforming to supply hydrogen) (e.g., U.S. Pat. Publ. No. 2010/0256428, Marker et al.) is directed to a high pressure system with a pressure range from 100-800 psig (for hydropyrolysis, hydroconversion and gas reforming).

3. SUMMARY OF THE INVENTION

In particular non-limiting embodiments, the present invention provides a catalytic biomass pyrolysis process that combines biomass and hydrogen with a catalyst at low pressure (around 6 bar but optimally at a pressure just high enough to overcome the pressure drop in the system somewhere around 4.5 bar or less but as low as 0.5 bar) to produce a hydrocarbon-rich bio-oil intermediate that can be upgraded into finished fuels or blend stocks using conventional hydroprocessing technology.

In one embodiment, the invention is a reactive catalytic biomass pyrolysis process comprising reacting a biomass starting material under pyrolysis conditions in the presence of a catalyst and a gas feed to the pyrolysis reactor of about 10 volume % to about 90 volume % hydrogen gas at a pressure of less than about 6 bar to form a stream comprising a pyrolysis product.

In another embodiment, the invention is to a catalytic biomass pyrolysis system comprising: (a) a reactor adapted for reacting a biomass with a catalyst and a gas stream with about 10 volume % to about 90 volume % hydrogen gas at a pressure of less than about 6 bar under pyrolysis conditions to form a pyrolysis reaction stream; (b) a separation unit in connection with the reactor and adapted to form a first stream comprising a solids fraction from the pyrolysis reaction stream and a second stream comprising a vapors fraction from the pyrolysis reaction stream; and (c) a condenser unit in communication with the separation unit and adapted to condense a mixture of bio-crude, water and/or another liquid from the vapors in the second stream separate from a gas component of the second stream.

4. BRIEF DESCRIPTION OF THE FIGURES

FIG. 1. Detailed view of reactive gas catalytic biomass fast pyrolysis unit operation.

Figure 2:
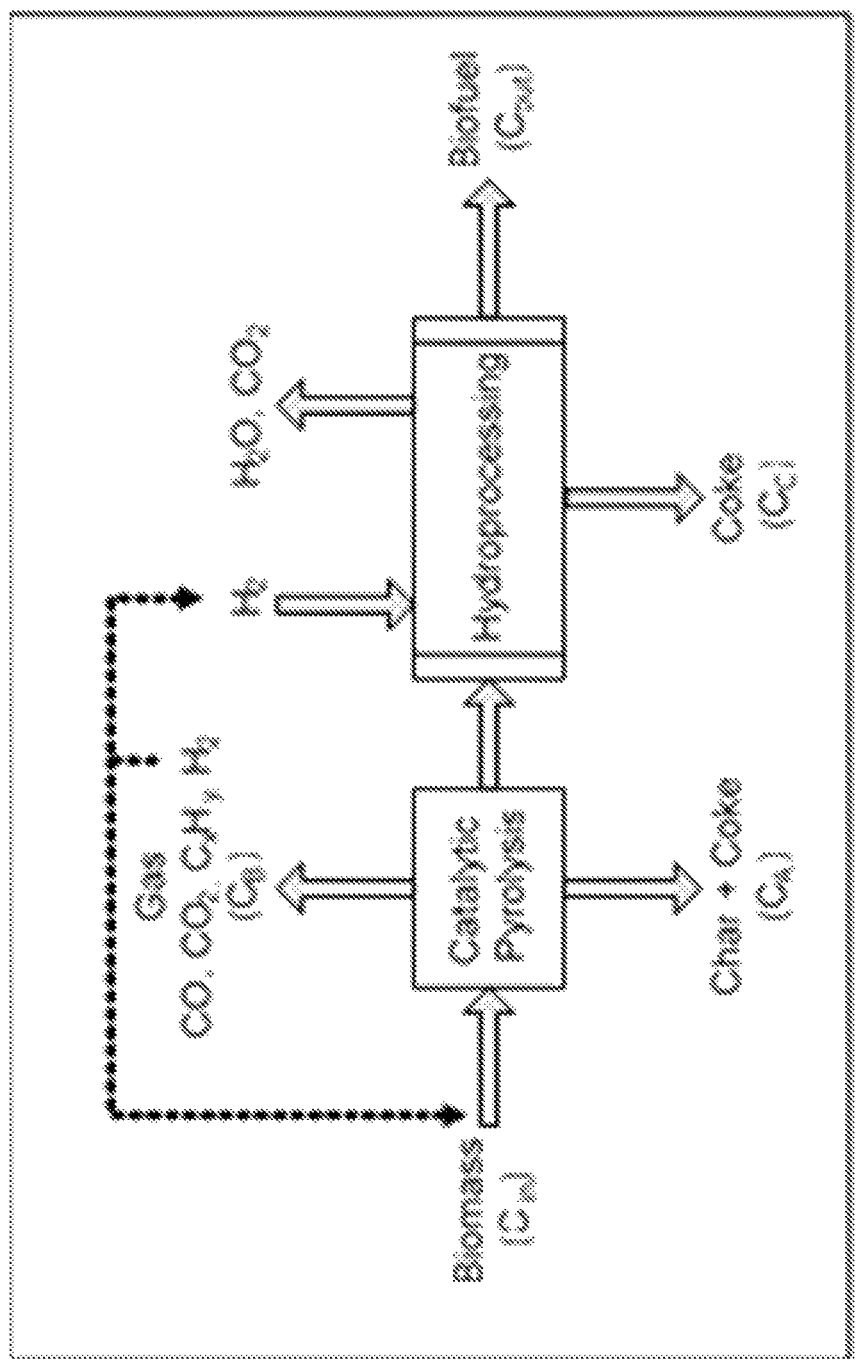

FIG. 2. Integrated catalytic fast pyrolysis.

Figure 3:
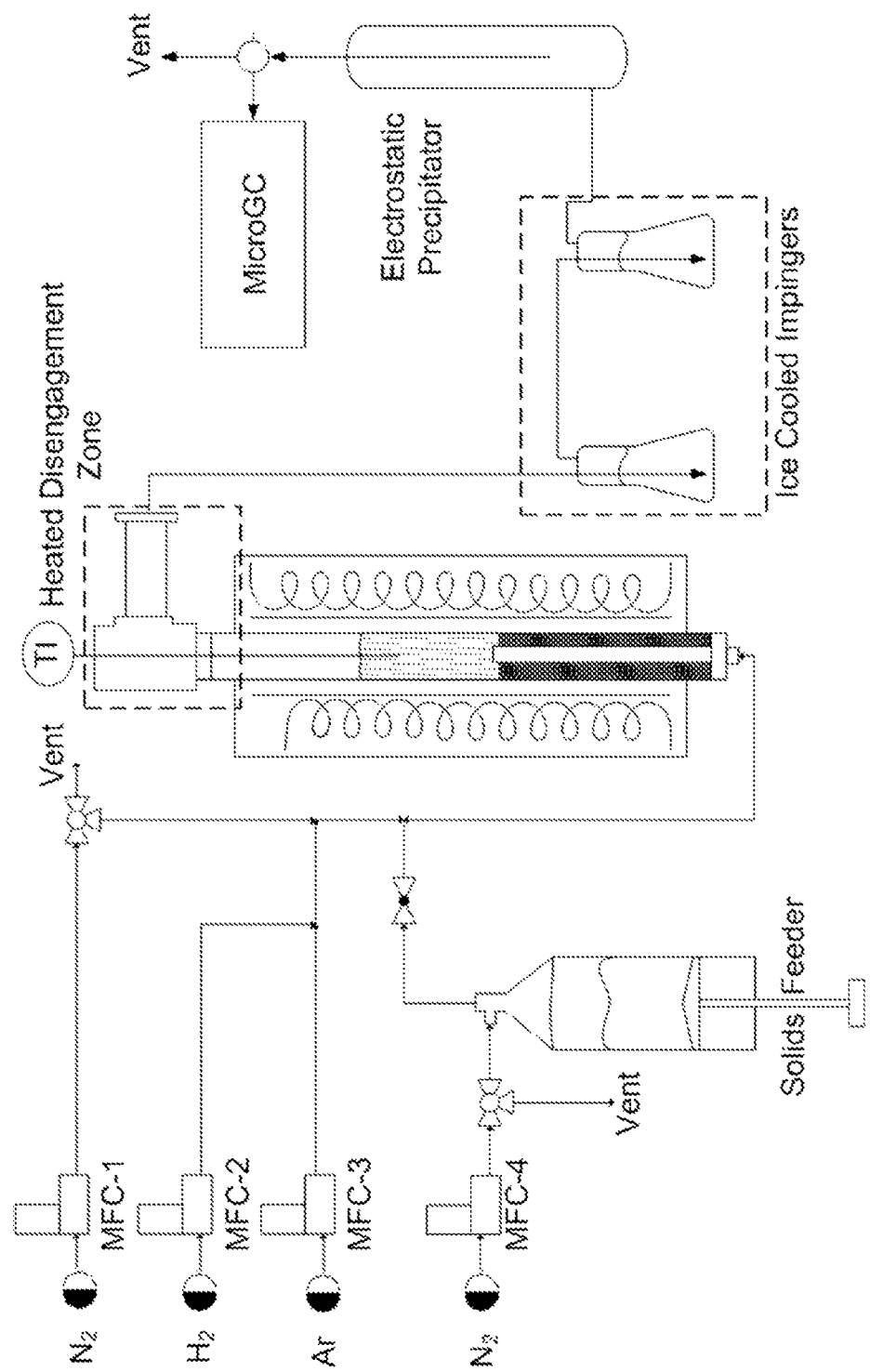

FIG. 3. Process flow diagram of bench-top 1"-diameter fluidized bed system.

Figure 4:
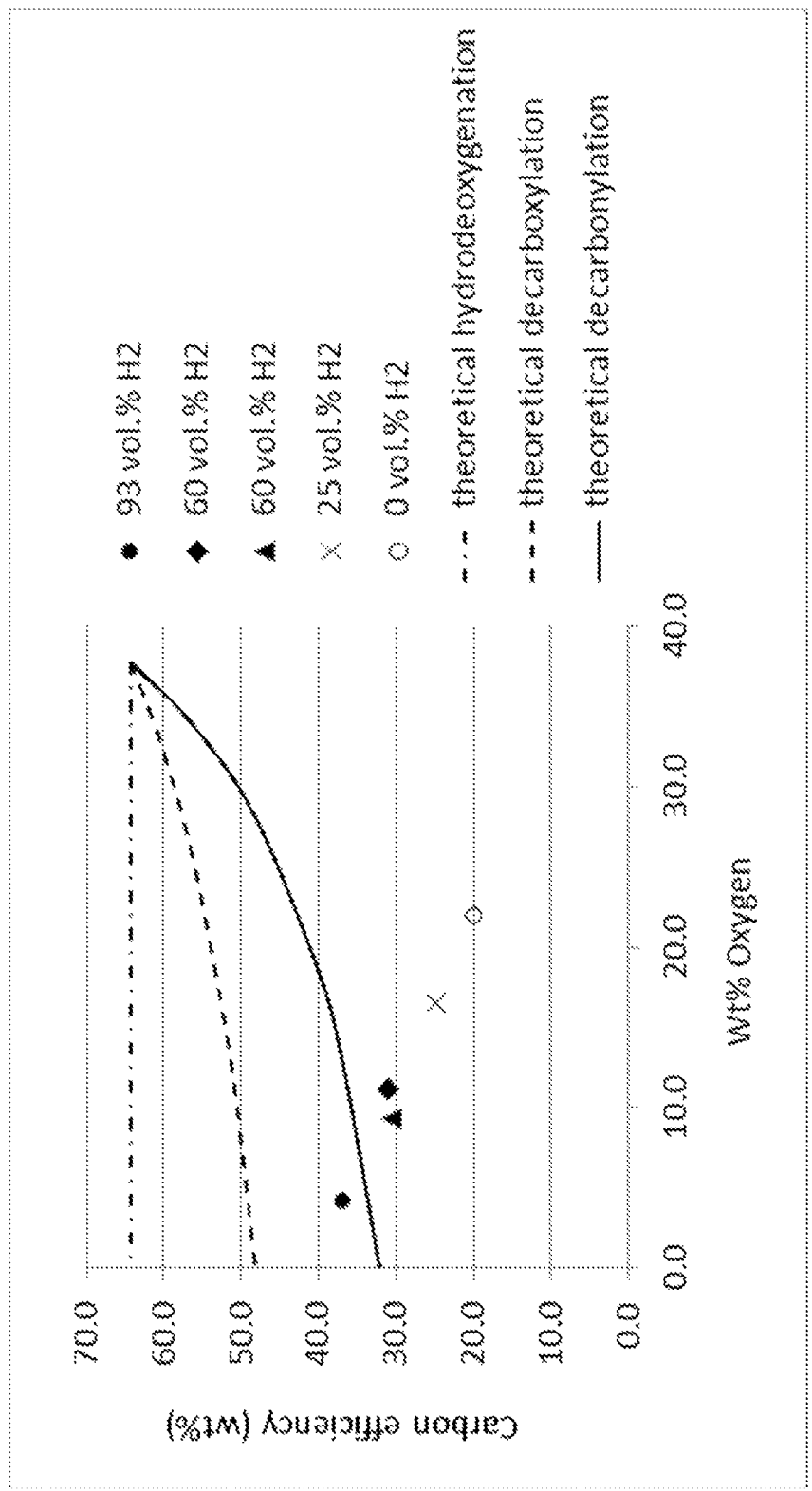

FIG. 4. Comparison of experimental carbon efficiencies for bio-oil from RCFP with RTI-A9P to theoretical deoxygenation mechanism for reducing the oxygen content of fast pyrolysis bio-oil.

Figure 5:
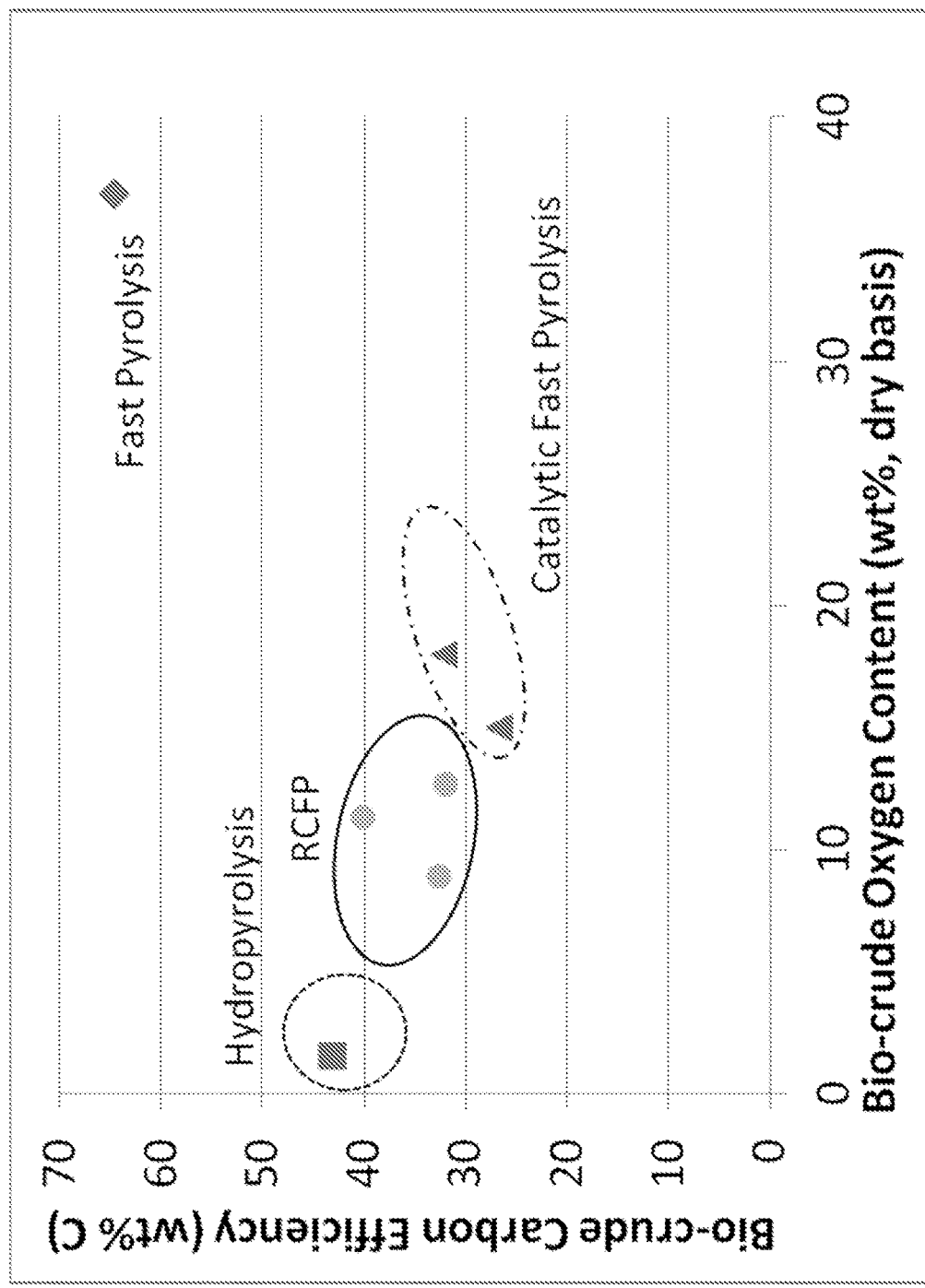

FIG. 5. Comparison of the carbon efficiency of the bio-crude along with the varying bio-crude oxygen content across varying technologies investigated.

Figure 6:
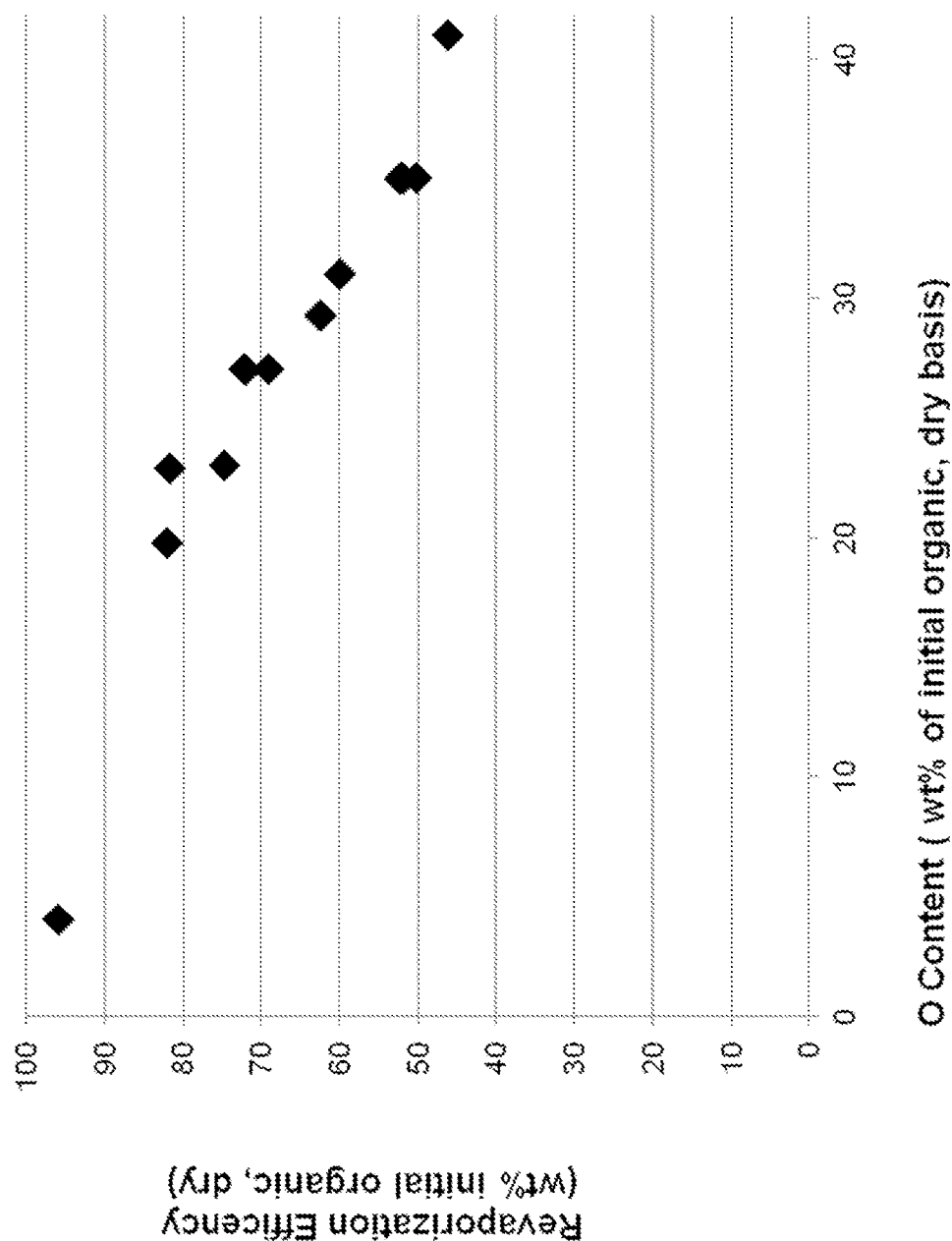

FIG. 6. Shows the revaporization efficiency at 350° C. for bio-crudes with varying oxygen contents.

5. DETAILED DESCRIPTION OF THE INVENTION

This invention relates to the use of catalysts, including hydrodeoxygenation catalysts, consisting of platinized, metal phosphide, or transition metal promoted catalyst formulations in a catalytic biomass pyrolysis process utilizing hydrogen at low total pressure for the production of bio-crudes from biomass. These catalyst formulations have been demonstrated to produce low oxygen content (below 10 wt %) in the bio-crude while minimizing over cracking and coke formation to achieve attractive separable bio-crude yields (>21%) resulting in attractive carbon efficiencies (between about 30% and about 70%). These yields and carbon efficiencies are similar to those in catalytic fast pyrolysis with various catalysts but produce an improved quality bio-crude and reduce carbon loss to the aqueous stream. The invention also includes use of catalysts described in PCT Application No. PCT/US14/49007, filed Jul. 31, 2014 and U.S. Provisional Application No. 61/860, 637, filed Jul. 31, 2013, Shen et al.

The invention pertains to: (i) catalyst formulations including promoters to utilize $H_2$ at a gas feed inlet of >10 volume percent at low total pressure (pressure will only be needed to operate the reactor, which should be <75 psig (~6 bar)); (ii) catalytic process in which $H_2$ is consumed to reduce oxygen content in the desired organic liquid product through increased water production (hydrodeoxygenation); (iii) The use of externally generated hydrogen; (iv) The use of recycled product gases and supplemental hydrogen to achieve the desired hydrogen concentration; (v) use in catalytic processes with the addition of $H_2$ such as a catalytic fast pyrolysis similar to that described in PCT/US13/29379 (Catalytic Biomass Pyrolysis Process), but also as an improvement to other processes, such as KiOR's biomass catalytic cracking process (PCT Publ. No. WO 2011/096912, O'Conner et al.) and Ensyn's RTP technology (U.S. Pat. No. 5,792,340, Freel et al.); (vi) modified catalytic pyrolysis process similar to that described in PCT/WO13/29379.

More specifically, the invention provides a reactive catalytic biomass pyrolysis process comprising reacting a biomass starting material under pyrolysis conditions in the presence of a catalyst and a gas feed to the pyrolysis reactor of about 10 volume % to about 90 volume % hydrogen gas at a pressure of less than about 6 bar to form a stream comprising a pyrolysis product.

In some embodiments, the gas feed to the pyrolysis reactor contains hydrogen derived from methane. Alternatively, the pyrolysis product comprises a hydrogen-rich pyrolysis gases and hydrogen from the hydrogen-rich pyrolysis gases is recycled so as to contribute to the gas feed to the pyrolysis reactor which may or may not be blended with hydrogen from an additional source.

In preferred embodiments, the gas feed to the pyrolysis reactor is about 30 volume % to about 90 volume % hydrogen gas, more preferably about 50 volume % to about 90 volume % hydrogen gas.

The gas feed to the pyrolysis reactor also contains carbon monoxide, carbon dioxide, nitrogen, alkanes, alkenes, helium, argon, or a mixture thereof or additional gases from the hydrogen-rich pyrolysis gases.

The biomass starting material may be a lignocellulosic material such as an agricultural residue, a forest residue, a paper sludge, waste paper, or a municipal solid waste. It may be particularized with an average particle size of about 25 mm or less, an average particle size of about 0.1 mm to about 8 mm.

The catalyst may be a metal or metal oxide on an acidic support and the metal or metal oxide is tungsten, molybdenum, chromium, iron, ruthenium, cobalt, iridium, nickel, palladium, platinum, copper, silver, gold, tin, an oxide thereof, or a combination thereof.

The acidic support may be silica, alumina, zirconia, tungstated zirconia, sulfated zirconia, titania, ceria, or a zeolite.

The catalyst may be a metal or metal oxide on a mixed metal oxide support where the metal or metal oxide is tungsten, molybdenum, chromium, iron, ruthenium, cobalt, iridium, nickel, palladium, platinum, copper, silver, gold, tin, an oxide thereof, or a combination thereof, such as CoMo, NiMo or NiW on a support. Here, the support may be an acidic support and the acidic support is chosen from silica, alumina, zirconia, tungstated zirconia, sulfated zirconia, titania, ceria, or a zeolite.

The catalyst may also be a metal phosphide on an acidic support such as nickel phosphide, iron phosphide, molybdenum phosphide, tungsten phosphide, copper phosphide, cobalt phosphide, or chromium phosphide. The catalyst may be a metal phosphide on a mixed metal oxide support.

The catalyst may also contain a binder material such as a macroreticulate polymer, a kieselguhr, a kaolin, a bentonite, clays, or a combination thereof.

The process may further comprise: transferring the pyrolysis product stream to a separator; separating a vapor and gas fraction from a solids fraction comprising pyrolysis product solids and the catalyst; and regenerating and recycling the catalyst into the pyrolysis process. The vapor and gas fraction may be transferred to a condenser wherein a liquid product is separated from a gaseous fraction. The liquid product may be separated into an aqueous phase and a bio-oil.

The bio-oil may have an oxygen content of about 0.5% to about 25% by mass on a dry basis based on the overall mass of the bio-oil. The bio-oil may be aliphatic compounds, aromatic compounds, polyaromatic compounds, phenols, aldehydes, ketones, organic acids, hydrocarbons, or mixture thereof.

The process may exhibit a carbon conversion efficiency of about 20% or greater by weight or about 20% to about 65% by weight.

In another embodiment, the invention is to a catalytic biomass pyrolysis system comprising: (a) a reactor adapted for reacting a biomass with a catalyst and a gas stream with about 10 volume % to about 90 volume % hydrogen gas at a pressure of less than about 6 bar under pyrolysis conditions to form a pyrolysis reaction stream; (b) a separation unit in connection with the reactor and adapted to form a first stream comprising a solids fraction from the pyrolysis reaction stream and a second stream comprising a vapors fraction from the pyrolysis reaction stream; and (c) a condenser unit in communication with the separation unit and adapted to condense a mixture of bio-crude, water and/or another liquid from the vapors in the second stream separate from a gas component of the second stream.

The catalytic biomass pyrolysis system may further comprise (d) a liquid separator unit in fluid communication with the condenser unit and adapted to separate water or another liquid from the bio-crude. It may further comprise (e) a catalyst regeneration unit in fluid communication with the separation unit and adapted to remove non-catalyst solids from the solid catalyst present in the first stream. It may also further comprise (f) a catalyst delivery stream adapted to deliver regenerated catalyst from the catalyst regeneration unit to the reactor or (g) a hydrogen production unit in communication with the condenser unit and adapted to generate hydrogen from methane or other hydrocarbons for introduction into the reactor.

The catalytic biomass pyrolysis system may further comprise a hydroprocessing unit in which the bio-crude from the liquid separator is further processed to remove oxygen and increase the hydrogen to carbon ratio of the bio-crude material.

The catalytic biomass pyrolysis system may further comprise an oxidant stream in fluid communication with the catalyst regeneration unit and adapted to deliver an oxidant to the catalyst regeneration unit or the condenser unit is in fluid communication with the reactor via a gas flow stream adapted to transfer a portion of the gas component of the second stream to the reactor.

The catalytic biomass pyrolysis system may further comprise a blower unit interposed between and in fluid communication with the condenser unit and the reactor.

The catalytic biomass pyrolysis system may further comprise a biomass preparation unit in fluid communication with the reactor and adapted to transfer the biomass to the reactor.

The catalytic biomass pyrolysis system may have a biomass preparation unit adapted to particularize a solid biomass to a size of about 25 mm or less.

The reactor may be adapted to combine the catalyst and the biomass in a ratio of about 1:10 to about 1000:1 based on mass. The reactor may be a transport reactor.

In either the process or the system, may be carried out at a temperature of about 200° C. to about 700° C., or about 350° C. to about 550° C.

The catalyst and the biomass starting material in the pyrolysis reactor may be provided in a ratio of about 1:10 to about 1000:1 based on mass or a ratio of about 1:5 to about 100:1 based on mass.

The process may be carried out at a pressure of up to about 4.5 bar, up to about 2.5 bar or at ambient pressure.

5.1. Definitions

The terms "bio-oil" and "bio-crude" can be used interchangeably and are intended to mean the fraction of reaction products obtained from a pyrolysis reaction that is liquid at ambient condition. The liquid-phase products may comprise hydrophilic phase compounds, hydrophobic phase compounds, or a mixture of hydrophilic and hydrophobic phase compounds. In certain embodiments, the bio-oil comprises a compound or a mixture of compounds such that the bio-oil is suitable for co-processing with traditional crude oil in existing oil refineries. As such, the bio-oil preferably comprises a compound or a mixture of compounds such that the bio-oil is suitable for undergoing further reactions, such as distillation and/or catalytic processing, that transform the bio-oil into a biofuel, such as bio-diesel, bio-gasoline, bio-jet fuel, or the like.

The biomass starting material particularly may comprise a wide variety of cellulosics and lignocellulosics. For example, the biomass can be derived from both herbaceous and woody sources. Non-limiting examples of herbaceous or woody biomass sources useful according to the invention include wood (hardwood and/or softwood), tobacco, corn, corn residues, corn cobs, cornhusks, sugarcane bagasse, castor oil plant, rapeseed plant, sorghum, soybean plant, cereal straw, grain processing by-products, bamboo, bamboo pulp, bamboo sawdust, and energy grasses, such as switchgrass, miscanthus, and reed canary grass. Still further, useful biomass may comprise "waste" materials, such as corn stover, rice straw, paper sludge, waste papers, municipal solid wastes, and refuse-derived materials. The biomass also may comprise various grades of paper and pulp, including recycled paper, which include various amounts of lignins, recycled pulp, bleached paper or pulp, semi-bleached paper or pulp, and unbleached paper or pulp.

In the catalytic biomass pyrolysis process, biomass preparation can comprise size reduction and drying of the biomass. Thus, the biomass can be characterized as being particularized, which may be a natural state of the biomass or may result from processing steps wherein a biomass material is converted to a particularized form. Ideally, the size of the biomass introduced into the reactor can be such that heat transfer rates are high enough to maximize bio-oil production. Cost of size reduction and bio-oil yield preferably are balanced. In certain embodiments of the present process, biomass particles can have an average size of about 25 mm or less, about 15 mm or less, about 8 mm or less, about 5 mm or less, about 2 mm or less, about 1.5 mm or less, or about 1 mm or less. In specific embodiments, average particle size can be about 0.1 mm to about 25 mm, about 0.1 mm to 15 mm, about 0.1 mm to about 8 mm, about 0.1 mm to about 5 mm, about 0.1 mm to about 2 mm, or about 0.1 mm to about 1.5 mm.

Moisture content of the biomass preferably is as close as possible to 0% by mass. In some instances, this may be cost prohibitive. Moisture content of the biomass can be adjusted external to the process or internally by integrating a heat source to maintain the input biomass to a moisture content of about 15% or less by mass, about 10% or less by mass, about 7% or less by mass, or about 5% or less by mass.

Biomass pyrolysis can form a cocktail of compounds in various phases, and the pyrolysis product can contain in the range of 300 or more compounds. In previous methods for the pyrolysis of biomass, the starting material typically is heated in the absence of added oxygen to produce a mixture of solid, liquid, and gaseous products depending upon the pyrolysis temperature and residence time. When biomass is heated at low temperatures and for long times (i.e., "slow pyrolysis"), charcoal is the dominant product. Gases are up to 80% by weight of the product when biomass is heated at temperatures above 700° C. In known methods of "fast pyrolysis" or "flash pyrolysis", biomass is rapidly heated to temperatures ranging from 400° C. to 650° C. with low residence times, and such methods commonly achieve products that are up to 75% by mass organic liquids on a dry feed basis. Although known methods of flash pyrolysis can produce bio-oils from various feedstocks, these oils typically are acidic, chemically unstable, and require upgrading.

5.2. Methodology Overview

This advanced biofuels technology improves hydrogen utilization and carbon recovery in a novel, direct biomass liquefaction process. A block flow diagram of this concept is shown in FIG. 1. The primary aspect of this concept is to use hydrogen during catalytic biomass pyrolysis at ambient pressure to maximize the biomass carbon and energy recovery in a low oxygen content, thermally stable bio-crude intermediate that can be efficiently and easily upgraded into a finished biofuel.

Improved hydrogen utilization during catalytic biomass pyrolysis has the potential to improve bio-crude yields by reducing char and coke formation while simultaneously reducing the bio-crude oxygen content. This is achieved by developing a new catalyst for catalytic fast pyrolysis (CFP) that has high hydrodeoxygenation (HDO) activity but works at or near atmospheric pressure in the presence of hydrogen. Using the technology described herein, a bio-crude intermediate with <10 wt % oxygen with greater than about 30% carbon efficiency can be produced at near atmospheric pressure, which is comparable to traditional hydropyrolysis at high pressures (300 psig).

5.3. Background

Using catalysts to improve the physical and chemical properties of bio-oils is currently an active area of research, development, and demonstration [1-13]. Catalysts can be used downstream of the pyrolysis reactor to upgrade the pyrolysis vapors or they can be added in direct contact with the biomass in the primary pyrolysis reactor in a CFP process as shown in FIG. 2.

The goal of these advanced biofuels processes is to produce hydrocarbon-rich liquid intermediates that can be upgraded using conventional refining technology to produce cost-competitive gasoline, diesel, and jet fuel that leverages the capital expenditures in the existing petroleum refining and distribution infrastructure.

The role of the catalyst in direct biomass liquefaction processes is to control the chemistry during biomass pyrolysis to minimize carbon loss to char, light gases, and coke and control deoxygenation. Oxygen removal during direct biomass liquefaction can occur by dehydration (loss of $H_2O$), decarboxylation (loss of $CO_2$), and decarbonylation (loss of CO). Dehydration of the cellulose and hemicellulose fractions during biomass pyrolysis (with or without a catalyst) produces water, referred to as water of pyrolysis that is the most abundant component of the liquid phase product. Biomass is inherently oxygen-rich and hydrogen-deficient, and the pyrolysis products become even more hydrogen deficient as dehydration occurs. This increases the tendency for aromatic formation and ultimately leads to char production. Deoxygenation by CO and $CO_2$ removal (decarboxylation and decarbonylation) plus any carbon losses from coke formation on the catalyst lead to lower hydrocarbon liquid yields and lower energy recovery in the bio-crude intermediate. Thermal or catalytic cracking tends to produce gas phase products and carbonaceous solids (char and coke).

A catalytic biomass pyrolysis process has been demonstrated in a 1"-diameter fluidized bed reactor with a novel catalyst to prove the concept. Catalyst properties are optimized to minimize gas and coke production and improve catalytic deoxygenation and bio-crude yields. In the current state of technology, bio-oil from fast pyrolysis contains >40 wt % oxygen. Recent results demonstrate that catalytic fast pyrolysis (CFP) bio-crudes contain <20 wt % oxygen, with the organic fraction containing as low as 12 wt % oxygen under optimized process conditions. These oxygen numbers are >50% lower compared with traditional fast pyrolysis oils. A comparison of the fast pyrolysis bio-oil (baseline), hydropyrolysis and CFP bio-crude produced from white oak is shown in Table 1.

TABLE 1

Product yields and stream compositions from white oak fast pyrolysis, CFP, and hydropyrolysis

| Weight % | Baseline | RTI-CFP | HYP |
|---|---|---|---|
| Solids | 14.3 | 19.8 | 17.2 |
| Liquid | 67.8 | 53.5 | 64.5 |
| Gas | 11.6 | 23.9 | 17.3 |
| Undetermined | 6.3 | 2.8 | 1.0 |
| Bio-crude composition (Wt %, dry basis) | | | |
| C | 56.6 | 72.8 | 86.5 |
| H | 5.8 | 7.2 | 9.3 |
| O | 37.7 | 19.9 | 4.2 |
| N | 0.09 | 0.07 | .06 |
| S | 0.006 | 0.015 | .01 |
| Gas composition (vol %) | | | |
| $H_2$ | 1.7 | 7.7 | 0.0 |
| CO | 28.1 | 37.1 | 6.1 |
| $CO_2$ | 46.5 | 32.6 | 11.5 |
| $CH_4$ | 3.8 | 10.6 | 47.1 |
| $C_{2+}$ | 19.9 | 12.0 | 35.3 |

Hydropyrolysis is an catalytic biomass pyrolysis process where biomass and catalyst are combined at elevated temperatures, pressure, and a high hydrogen partial pressure to hydrodeoxygenate biomass pyrolysis vapors and produce low oxygen containing hydrocarbon-rich liquid product. Several groups have demonstrated the technical feasibility of producing hydrocarbon liquids from biomass at hydropyrolysis conditions [14-18]. This pathway has shown the potential to produce very low oxygen containing intermediates (below 5 wt %, dry basis) with attractive carbon yields (>30%).

HDO is thought to be the dominant oxygen rejection pathway during hydropyrolysis. In 20% $H_2$ at 300 psig total pressure, the hydrogen consumption measured during hydropyrolysis with the commercial hydrotreating catalyst ranged from 20-25 g per kg of biomass fed. The total water yield from both liquid product fractions ranges from 35 to 40 wt %. At higher hydrogen concentrations, the hydrogen consumption increased to 35-38 g/kg biomass fed though no significant increase in water yield was measured. This suggests that at higher hydrogen partial pressures, additional hydrogenation or hydrogen addition reactions are occurring without additional deoxygenation resulting in higher hydrogen-carbon ratio in the product stream.

The lower oxygen content bio-crude intermediate will have lower downstream $H_2$ demand. However, hydropyrolysis does have a distinct disadvantage of being a high pressure conversion process that necessitates feeding solids across a pressure barrier. This makes the process potentially more complex with higher cost materials of construction compared to an atmospheric pressure catalytic biomass pyrolysis conversion process. A commercial process that requires feeding biomass at high pressure has poorer reliability and availability and higher maintenance costs than an atmospheric pressure process.

Involvement in technology development for catalytic biomass pyrolysis and hydropyrolysis has led to unique insights for developing an innovative, new bio-oil process, RCFP, with higher yields of low oxygen content bio-crude and improved carbon efficiency. The key to this novel process is developing a robust catalyst that efficiently uses hydrogen for HDO at about ambient pressure and increases the H/C ratio in volatile products to limit char and coke formation.

Recent work by Oyama and colleagues [23-25] has demonstrated hydroprocessing of cresol at atmospheric pressure and similar work by Lobo [26-28] demonstrated HDO of guaiacol at atmospheric pressure. Although understanding hydrogen use in biofuels processing has increased, little attention has been given to effective utilization of hydrogen at near atmospheric pressure in direct biomass liquefaction pathways.

The solid acid and metal oxide CFP catalysts were promoted with precious metal or metal phosphides and tested in the proof-of-concept studies. Hydrogen utilization in RCFP shows potential to have a significant impact on the development of biomass conversion technologies.

Precious metals are known to have HDO activity, but clearly lower cost alternatives are desired for commercial biofuels production processes. The catalyst development efforts focused on alternatives to precious metals for atmospheric pressure hydrogenation and HDO, such as Ni, Fe, and other transition metal oxides. Recent literature also suggested that metal phosphides may be attractive candidates for this process [23-25].

Four catalyst classes have been identified as outlined in Table 3. Catalyst classes have been identified based on the types of materials (formulations) being considered.

TABLE 2

Summary of potential catalyst classes for RCFP

| Class | Description | Variables |
|---|---|---|
| 1 | Precious metal promoted solid acids<br>$1^{st}$ iteration: Pt promoted tungstated zirconia and alumina<br>Additional iterations: alternative promoters (e.g., Pd and Au) on additional supports ($CeO_2$, $ZrO_2$, $TiO_2$) | Precious metal loading<br>Acid strength<br>Surface area |
| 2 | Precious metal promoted mixed metal oxides<br>$1^{st}$ iteration: Pt on $Fe_2O_3$/CuO<br>Additional iterations: alternate promoters (Pd, Au) with additional metal oxides: NiO, $SnO_2$, CoO | Precious metal loading<br>Metal oxide composition (high Fe and high Cu)<br>Surface area<br>Additional promoters and supports |
| 3 | Metal phosphide promoted solid acids<br>$1^{st}$ iteration: $Ni_2P$ on tungstated zirconia and alumina<br>Additional iterations: alternative phosphipdes ($Fe_2P$ and $Co_2P$) and supports ($CeO_2$, $ZrO_2$, $TiO_2$) | Phosphide loading<br>Acid strength<br>Surface area<br>Additional promoters and supports |
| 4 | Metal phosphide promoted mixed metal oxides<br>1st iteration: $Ni_2P$ on $Fe_2O_3$/CuO<br>Additional iterations: alternative phosphides including ($Fe_2P \cdot Co_2P$) and metal oxides (NiO, $SnO_2$, CoO) | Phosphide loading<br>Metal oxide composition (high Fe and high Cu)<br>Surface area<br>Additional promoters and supports |

The Class 1 materials combine the acid-cracking activity with metals known to provide hydrogenation activity.

The Class 2 materials are metal oxides that have the potential to selectively remove oxygen through two simultaneous steps: direct deoxygenation over a supported metal or reduced metal oxide catalyst with variable valence states and indirect deoxygenation that uses catalytic hydrogen production for in-situ hydrotreating. Addition of precious metal provides additional hydrogenation activity and hydrogen dissociation on the catalyst surface.

The materials in Class 3 contain metal phosphides for hydrogen utilization that replace the precious metal in the Class 1 materials. The Class 3 materials have similar functionality compared with the Class 1 materials; however, studies of metal phosphides have recently shown the ability to facilitate the use of hydrogen in hydroprocessing.

Similarly, metal phosphides for hydrogen utilization in the Class 4 materials replace the precious metal in the Class 2 materials.

One of ordinary skill will recognize many units are regularly used to characterize pressure. For clarity, Table 3 shows conversion from psig to bar to atmospheres of pressure.

TABLE 3

| psig | bar | atm |
|---|---|---|
| 0 | 1.0 | 1.0 |
| 1 | 1.1 | 1.1 |
| 2 | 1.2 | 1.1 |
| 5 | 1.4 | 1.3 |
| 15 | 2.1 | 2.0 |
| 25 | 2.7 | 2.7 |
| 50 | 4.5 | 4.4 |
| 75 | 6.2 | 6.1 |
| 100 | 7.9 | 7.8 |
| 150 | 11.4 | 11.2 |
| 300 | 21.7 | 21.4 |
| 600 | 42.4 | 41.8 |
| 800 | 56.2 | 55.4 |

Unless defined otherwise, all technical and scientific terms used herein have the same meaning as commonly understood by one of ordinary skill in the art to which this invention belongs. The article "a" and "an" are used herein to refer to one or more than one (i.e., to at least one) of the grammatical object(s) of the article. By way of example, "an element" means one or more elements.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present invention may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

The following Examples further illustrate the invention and are not intended to limit the scope of the invention. In particular, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

6. EXAMPLES

Proof-of-Concept Studies

Many industrial refining processes like hydrocracking, isomerization, and naphtha reforming use hydrogen to control coke formation on the catalyst surface. Carbon deposition is the primary cause of catalyst deactivation, but catalyst activity can be recovered by oxidizing this carbon. The heat released during catalyst regeneration also maintains the process temperature. The addition of hydrogen in refinery unit operations can be adjusted to optimize product yields and manage the process heat balance.

This concept was extended by investigating the impact of adding hydrogen in an CFP process. An initial goal was to add hydrogen to an atmospheric pressure CFP process to control char and coke formation—the primary sources of carbon loss in the current process. Several catalysts from previous screening studies and new promoted catalysts were tested in a 1"-diameter fluidized bed CFP reactor system. The reactor temperature was fixed at 500° C., and a constant biomass feedrate of 1-2 g/min was maintained for all experiments. The two main variables were hydrogen concentration in the reactor and catalyst composition.

1"-Diameter Fluidized Bed Reactor System

A bench-top fluidized bed reactor system for investigating catalytic biomass pyrolysis is shown in FIG. 3. The RTI-CFP catalyst was tested in this reactor system where white oak sawdust was fed directly into the fluidized catalyst bed so pyrolysis takes place in the presence of the catalyst. The fluidized-bed reactor is a 1"-diameter quartz tube reactor externally heated in a furnace. An inert bed of silicon carbide acts as a support for the catalyst bed through which a ¼"-diameter tube injects the solid feed into the bottom of the catalyst bed. The exit of the reactor has a disengagement zone for solids collection and a condensation train for liquids collection. An online micro GC system is used to measure permanent gas composition.

In the feed system, the biomass was loaded in a syringe modified with an adapter that injects a sweep-gas and allows the exit of an entrained-biomass stream. The biomass feed rate was controlled by adjusting the sweep-gas feed rate and the head space in the syringe. The reactor operates at temperatures between 350° C. and 600° C., with 1 to 2 SLPM gas feed rate and a 0.5 to 1.5 g/min biomass federate. The reactor holds 25 to 60 g of catalyst that provides a total residence time in the reactor between 1 to 2 sec. Biomass was fed directly into the catalyst bed where pyrolysis takes place in the presence of the catalyst. The condensation system consists of an impinger cooled in an ice bath followed by an electrostatic precipitator and a second impinger cooled in a dry ice/acetone bath. Mass closures are consistently around 92 to 95% in this system. The product yields from biomass catalytic pyrolysis with numerous catalysts at a wide range of process conditions were measured in this system.

Catalyst Development and Testing

Catalysts for increased deoxygenation and carbon efficiency were screened for catalytic fast pyrolysis (fast pyrolysis in the presence of a catalyst as the heat transfer medium) in the presence of a reactive gas, namely hydrogen. Coke formation is the main source of carbon loss and catalyst deactivation, so catalysts with a lower propensity for coke production were sought to enhance carbon efficiency and increase bio-oil yields. Many industrial refining processes like hydrocracking, isomerization and naptha reforming utilize hydrogen to control coke formation on the catalyst surface.

A material for conventional catalytic fast pyrolysis—RTI-A9 was disclosed in co-owned PCT Publ. No. WO/2014/089131 claiming the benefit U.S. Provisional Application No. 61/733,142, filed Dec. 4, 2012, Dayton et al. RTI-A9 has good conversion but has a high coking tendency due to its strong acidic nature. If RTI-A9 is promoted with 0.5% platinum (RTI-A9P) the high coking tendency prevails under an inert environment. However, with the addition of hydrogen in the reactor gas at atmospheric pressure, the coke production decreases and the bio-crude yield increases compared to its unpromoted counterpart. The bio-crude oxygen content is reduced and the carbon efficiency into the bio-crude fraction increases. This is due to coke prevention from the addition of both platinum and hydrogen into the system leading to more hydrodeoxygenation or HDO. The effect of added hydrogen correlates with an increase in carbon efficiency and a decrease in oxygen content (see graphs). The hydrocarbon concentration in the aqueous fraction also decreases as more hydrogen is added as deoxygenated hydrocarbons are more easily separated into the organic fraction. At ~93% hydrogen, the water content of the aqueous fraction is ~93% as compared to around ~80% in the aqueous phase without added hydrogen. Better hydrocarbon separation equates to easier downstream processing and potentially easier aqueous fraction cleanup. Other catalysts tested include a metal oxide redox catalyst (RTI-A2) described in co-owned WO 2013/13438 (PCT/US13/29379) Catalytic Biomass Pyrolysis and RTI-A2 promoted with platinum. When this RTI-A2 catalyst is in its reduced form it does a good job deoxygenating the pyrolysis vapors to around ~12% oxygen but in poor yields because of coke formation and hydrocarbons dissolved in the aqueous fraction. This coke formation is reduced with this redox catalyst in the presence of $H_2$ and stays more active because the hydrogen in the reactor atmosphere keeps the catalyst in a more reduced state. The organic bio-crude yield increased using the platinized RTI-A2 catalyst with hydrogen. Coke formation is reduced so the hydrodeoxygenation activity of the catalyst remains high and the lower oxygen content of the bio-crude contains more hydrophobic hydrocarbon products that do not dissolve in the aqueous fraction.

TABLE 4

Summary of the effect of hydrogen concentration on catalytic biomass pyrolysis with RTI-A9, RTI-A9P, RTI-A2, and RTI-A2P

|  | RTI-A9 | | | | RTI-A9P | | | | RTI-A2 | RTI-A2P |
| --- | --- | --- | --- | --- | --- | --- | --- | --- | --- | --- |
| vol % Hydrogen | 0% | 25% | 60% | 93% | 0% | 25% | 60% | 93% | 60% | 60% |
| | | | | Yields wt % biomass | | | | | | |
| Gas | 22.7 | 16.2 | 18.9 | 22.4 | 24.7 | 26.2 | 21.6 | 25.4 | 23.3 | 26.4 |
| Solid | 21.8 | 20.7 | 18.6 | 20.2 | 22.4 | 26.9 | 18.5 | 17.1 | 23.0 | 12.9 |

TABLE 4-continued

Summary of the effect of hydrogen concentration on catalytic biomass pyrolysis with RTI-A9, RTI-A9P, RTI-A2, and RTI-A2P

|  | RTI-A9 | | | | | RTI-A9P | | | RTI-A2 | RTI-A2P |
|---|---|---|---|---|---|---|---|---|---|---|
| Aqueous | 32.9 | 33.3 | 33.3 | 31.3 | 31.7 | 28.8 | 35.7 | 36.8 | 31.1 | 39.1 |
| Organic | 16.2 | 19.3 | 20.2 | 20.2 | 14.1 | 17.8 | 18.8 | 21.1 | 12.3 | 28.6 |
| wt % Oxygen in bio-oil | 18.8 | 18.5 | 16.2 | 16.5 | 22 | 16.5 | 11.1 | 4.24 | 11.0 | 12.7 |
| Bio-oil carbon efficiency | 23.7 | 28.3 | 25.4 | 28.0 | 19.8 | 24.8 | 31.1 | 36.9 | 19.2 | 35.6 |

Table 4 shows mass balances and the carbon efficiency versus oxygen content for the bio-crudes produced by catalytic fast pyrolysis of white oak at 500° C. with the RTI-A9 acid catalyst with varying $H_2$ volume percent. As the concentration of hydrogen increases, there is a very slight decrease in oxygen content and very slight increase in carbon efficiency along with a slight decrease in solids (char+catalyst coke). Table 4 also shows the oxygen content for the bio-crudes produced by the RTI-A9 catalyst with varying $H_2$ volume percent.

For comparison, the mass balance and carbon efficiency in the bio-crude for the catalytic pyrolysis of white oak at 500° C. over RTI-A9P. It is seen that as the partial pressure/concentration of hydrogen increases, there is a corresponding increase in the carbon efficiency into the bio-oil. The carbon efficiency increase as the hydrogen concentration increase using the platinized catalyst. This is largely due to the decrease in solids, due to reduced coke formation in the presence of hydrogen as the hydrogen concentration increases. The oxygen in the bio-oil reduces with increasing hydrogen concentration due to an increase in water formation from improved hydrodeoxygenation activity.

FIG. 4 indicates the carbon efficiency for deoxygenating fast pyrolysis bio-oil to a desired oxygen content based on one of three potential deoxygenation mechanisms; hydrodeoxygenation (HDO), decarboxylation (CO2) and decarbonylation (CO). These theoretical calculations assume there is a fixed amount of char and permanent gases that result from pyrolysis and that no other carbon by-products are formed in the deoxygenation. It is known that deoxygenating fast pyrolysis bio-oil is challenging with significant losses to light gasses and coking. Those losses mean that the actual carbon efficiency for deoxygenating fast pyrolysis bio-oil is significantly lower than any of the theoretical values. The theoretical calculations however demonstrate the effect of each deoxygenation mechanism on the carbon efficiency. In comparing these theoretical yields with experimental yields from RCFP with RTI-A9P, it can be seen that bio-oil yields are trending upward even with increased deoxygenation of the product indicating shifts toward increased hydrodeoxygenation.

FIG. 4 shows a comparison of experimental carbon efficiencies for bio-oil from RCFP with RTI-A9P to theoretical deoxygenation mechanism for reducing the oxygen content of fast pyrolysis bio-oil.

With selected catalysts, there is an increase in carbon efficiency in the bio-crude as the concentration of hydrogen in the reactor atmosphere increases and a corresponding decrease in the oxygen content of the bio-crude. This higher carbon efficiency corresponds to the decrease in solids as the coke formation on the catalyst decreases in the presence of hydrogen. The lower oxygen content in the bio-crude also correlates with an increase in water production from HDO.

The material balances and oxygen content of the organic bio-crude phase for hydropyrolysis (HYP) and two CFP experiments are compared with CFP with added hydrogen; which is refer as reactive gas CFP (RCFP), using different catalysts in Table 5. Comparing the material balances for the three bio-oil pathways represented in Table 5, hydropyrolysis clearly generates the most aqueous phase product but also produces bio-crude with the lowest oxygen content. This represents efficient HDO of the biomass hydropyrolysis products. The CFP bio-crude yields with and without added hydrogen at atmospheric pressure are comparable to the hydropyrolysis bio-crude yields, but the oxygen contents of these products are higher. Note, however, the lower oxygen content of the RCFP bio-crudes compared with the CFP bio-crudes. The solids yield of the RCFP processes is lower than the solids produced from the CFP process due to less coke formation.

TABLE 5

Experimental material balances for CFP and hydropyrolysis (HYP) processes compared with the new proposed Reactive Gas CFP (RCFP) process with selected catalysts.

|  | HYP | RCFP Catalyst 1 | RCFP Catalyst 2 | RCFP Catalyst 3 | CFP Conditions 1 | CFP Conditions 2 |
|---|---|---|---|---|---|---|
| Yields on wt % input basis (biomass + $H_2$) | | | | | | |
| Gas | 17.61 | 18.84 | 25.53 | 21.22 | 21.66 | 21.01 |
| Solid | 8.68 | 19.00 | 12.9 | 6.07 | 19.1 | 21.8 |
| Aqueous Phase | 45.95 | 31.44 | 33.33 | 33.00 | 32.62 | 32.95 |
| Liquid Bio-crude | 21.95 | 22.16 | 25.28 | 28.83 | 21.88 | 17.89 |
| Bio-crude Oxygen Content (wt % - dry basis) | 1.5 | 8.9 | 12.7 | 11.3 | 18 | 14.9 |

The bio-crude yields from the three bio-oil pathways are highlighted in Table 6. The water content of these phase-separated bio-crude samples was measured using Karl-Fischer titration and is also shown. The RCFP bio-crude samples tend to contain more water, while the hydropyrolysis and CFP bio-crudes more effectively phase separate. The water content in the bio-crudes is also a function of the oxygen content. The density of the hydropyrolysis bio-crude is ~0.80 g/ml, and the low oxygen content clearly makes it more hydrophobic. The CFP bio-crude on the other hand has a density of ~1.1 g/ml with higher oxygen content. Phase separation of the denser CFP bio-crude and the aqueous phase is effective. The RCFP bio-crudes have lower oxygen content than the CFP bio-crudes. The density of the RCFP bio-crude is less than 1 g/ml but less hydrophobic than the hydropyrolysis bio-crude, so separating the organic and aqueous phases is not as easy. The separation may be improved by further reducing the oxygen content of the bio-crude produced by RCFP.

The hydrocarbon content of the aqueous phase collected from the three bio-oil pathways is also a function of the deoxygenation efficiency of the process. The carbon content of the CFP aqueous phase products ranges from 5-7 wt % based on the input biomass. The carbon content of the RCFP aqueous phase products is between 2.5-5 wt % of the input biomass, and the hydropyrolysis aqueous phase contains 0.5 wt % of the input carbon. The carbon content of the RCFP aqueous phase also decreases as the hydrogen concentration in the reactor increases.

The commercial viability of these three bio-oil pathways can be assessed by comparing how the relative yields, hydrogen demand, and carbon recovery potential affects the preliminary techno-economics of each process. The biofuels yield and hydrogen demand is calculated from the experimental material balances presented in Table 7 and bio-crude oxygen content presented in Table 6. The calculated fuel yield presented in Table 7 is based on upgrading the bio-crudes produced from each process in a hydroprocessing step. The calculation assumes no carbon losses during hydroprocessing. The hydrogen demand determined for each conversion process shown in Table 7 was experimentally measured while the hydrogen demand for upgrading is calculated by assuming the remaining oxygen in the bio-crude is removed as water and the hydrogen-to-carbon ratio in the finished biofuel is two. The volumetric yield of the finished biofuels is based on a density of 0.8 g/ml, similar to diesel.

The total hydrogen demand for each process effectively correlates with bio-crude yield because more hydrogen is required to deoxygenate and upgrade the intermediate bio-crude produced. The CFP and RCFP processes have about the same hydrogen demand for upgrading, but the RCFP process uses hydrogen in the conversion step so the total hydrogen demand is higher. Less hydrogen is required for deoxygenating the hydropyrolysis bio-crude because it has low oxygen content, but the hydrogen demand during hydropyrolysis is comparatively high because carbon efficiency is higher and there is near complete HDO in the conversion step.

The preliminary results for the proposed RCFP process demonstrate the potential for producing a low oxygen content bio-crude with high carbon efficiency. Table 8 highlights the strengths and weakness of this novel bio-oil pathway compared to CFP and hydropyrolysis. Optimizing catalyst performance and process conditions are essential for maximizing biofuel yields and minimizing overall hydrogen demand of the process while reducing wastewater treatment and disposal costs.

TABLE 6

Experimentally determined yields and oxygen contents for CFP and HYP bio-crudes compared with bio-crudes produced from the RCFP process.

|  | HYP | RCFP Catalyst 1 | RCFP Catalyst 2 | RCFP Catalyst 3 | CFP Conditions 1 | CFP Conditions 2 |
|---|---|---|---|---|---|---|
| Bio-crude Composition - wt % of biomass fed basis |  |  |  |  |  |  |
| Bio-crude, dry | 22.15 | 18.17 | 18.71 | 23.13 | 19.86 | 15.88 |
| Water in Bio-crude | 0.34 | 4 | 6.5 | 5.84 | 2 | 2 |
| Liquid Organic | 16.85 | 17.3 | 17.85 | 21.87 | 18.8 | 14.24 |
| C4-C6 | 5.3 | 0.87 | 0.86 | 1.26 | 1.06 | 1.64 |
| Bio-crude Oxygen Content - wt % dry basis | 1.5 | 8.9 | 12.7 | 11.3 | 18 | 14.9 |

TABLE 7

Summary of the biofuel yield and hydrogen demand for three bio-oil pathways.

|  | CFP | RCFP | HYP |
|---|---|---|---|
| Fuel Yield (gal/ton) | 52 | 64 | 76 |
| Conversion $H_2$ Demand scf/bbl | 0 | 1264 | 5322 |
| Upgrading $H_2$ Demand scf/bbl | 4200 | 3539 | 1980 |

TABLE 8

Strengths and weaknesses of CFP, hydropyrolysis, and RCFP bio-oil pathways

| Process | Strengths | Weaknesses |
|---|---|---|
| CFP | Ambient pressure technology<br>No hydrogen required for distributed stand-alone systems<br>Anhydrosugars and carboxylic acids reduced so bio-crude has lower TAN and improved thermal stability<br>High $CH_4$ potential from the aqueous phase | Bio-crude oxygen contents >10 wt %<br>Bio-crude still has significant fraction of carboxylic acids and PAHs<br>Increased carbon loss to aqueous phase<br>Hydrogen demand for upgrading to finished fuels<br>Catalyst coking |
| Hydropyrolysis | Bio-crude oxygen contents <5 wt %<br>Increased aliphatic content and near complete reduction of ketones and acids in the bio-crude<br>High carbon efficiency with low carbon loss to aqueous phase<br>Bio-crude: low TAN and very good thermal stability<br>Utilizes hydrogen for HDO<br>Low catalyst coking | High bio-crude aromatic content<br>Higher capital costs for pressurized equipment<br>High hydrogen pressure<br>Unproven commercial reliability for feeding biomass across pressure boundary |
| RCFP | Ambient pressure technology<br>Higher carbon efficiency compared to CFP and nearing that of hydropyrolysis<br>Bio-crude has reduced TAN and higher thermal stability compared to CFP<br>Lower PAHs, ketones and carboxylic acids in bio-crude compared to CFP<br>Utilizes hydrogen to increase HDO | Increased hydrogen demand<br>Hydrogen source required for stand-alone concepts<br>Higher carbon loss to aqueous phase than hydropyrolysis<br>High bio-crude phenolic content |

Abbreviations: PAH (polyaromatic hydrocarbons), TAN (total acid number).

Catalytic Fast Pyrolysis with Platinized or Transition Metal Promoted Catalysts Utilizing Hydrogen at Low Total Pressure Background A catalytic fast pyrolysis process utilizing hydrogen (RCFP) through the use of platinum promoted, metal phosphide promoted, or transition metal catalysts. The process is similar to that described in co-owned PCT/WO13/29379 Catalytic Biomass Pyrolysis and co-owned U.S. Provisional Application No. 61/733,142, filed Dec. 4, 2012, Dayton et al. except there is hydrogen present at a minimum amount (>10 volume percent of fluidization gas feed) during the catalytic pyrolysis step in the process to enhance hydrodeoxygenation or HDO.

The platinized catalyst is a platinum promoted solid acid or metal oxide catalyst believed to promote decarboxylation, decarbonylation, and dehydration through catalytic cracking. Acid catalysts are well known for promoting catalytic cracking reactions. Acidic, high surface area catalysts have been used for hydrocarbon cracking and the recent literature suggests that such solid acids catalyze both C—C and C—O bond breaking. Use of relatively small pore zeolites, such as ZSM-5, may not be appropriate because large organic molecules are cracked into moderate molecular weight hydrocarbons. Also, zeolites tend to produce large amounts of coke relatively fast reducing bio-crude yields. As in fluid catalytic cracking (FCC) processing, strong acid catalysts tend to produce coke precursors that lead to carbon deposition on the catalyst. Catalyst regeneration is achieved by using oxygen/air to oxidize surface carbon.

These platinum promoted or transition metal catalysts have been shown to produce low oxygen content (<10%) in the bio-crude while minimizing over cracking and significantly reducing coke formation to achieve attractive bio-crude yields (>21%) and energy recovery in the liquid product.

TABLE 9

Comparison of catalytic fast pyrolysis technologies

| Process | Bio-crude Yield (wt % fed biomass) | Bio-crude-Water content (wt % bio-crude) | Bio-crude Oxygen content (wt % bio-crude) | Bio-crude carbon yield (wt % C fed) | Aqueous Product Yield (wt % fed biomas) | Aqueous Product-Water Content (wt % Aqueous Product) | Aqueous Product Carbon Yield (wt % C fed) | Theoritcal Fuel yield (gal/dry ton) | Conversion Process H2 Consumption (g/kg biomass fed) |
|---|---|---|---|---|---|---|---|---|---|
| Catalytic Fast Pyrolysis | 18-22 | 9-11 | 15-18 | 27-32 | 30-33 | 79-87 | 5-7 | 47-57 | 0 |

TABLE 9-continued

Comparison of catalytic fast pyrolysis technologies

| Process | Bio-crude Yield (wt % fed biomass) | Bio-crude-Water content (wt % bio-crude) | Bio-crude Oxygen content (wt % bio-crude) | Bio-crude carbon yield (wt % C fed) | Aqueous Product Yield (wt % fed biomas) | Aqueous Product-Water Content (wt % Aqueous Product) | Aqueous Product Carbon Yield (wt % C fed) | Theoritcal Fuel yield (gal/dry ton) | Conversion Process H2 Consumption (g/kg biomass fed) |
|---|---|---|---|---|---|---|---|---|---|
| RCFP (60 vol % H2) | 23-29 | 18-25 | 9-11 | 33-40 | 31-33 | 85-91 | 2.6-4.6 | 57-71 | 5 |
| Hydropyrolysis | 22.5 | 1.5 | 1.5 | 43 | 47 | 95 | 0.5 | 76 | 25 |

Above in Table 9 is a comparison of catalytic fast pyrolysis technologies investigated. Key points and assumptions made are:

(i) Bio-crude Yield includes all C4-6 gas species in addition to collected organic liquid, does not include carbon lost to aqueous phase; (ii) Theoretical Fuel Yield is based on H/C of 2 and density of 0.8 g/ml, assumes no carbon loss in hydroprocessing; (iii) Biomass fed at bench-scale typical had a moisture content of 7-9 wt %; (iv) RCFP is an catalytic fast pyrolysis process based on process conditions and catalyst.

FIG. 5. Compares the carbon efficiency of the bio-crude along with the varying bio-crude oxygen content across varying technologies investigated.

Currently hydropyrolysis, or pyrolysis in the presence of hydrogen at high pressure (300 psig) has led to the best bio-crude yields and subsequently the highest theoretical fuel yields. This high pressure hydrogen process though involves large capital costs due to the materials of construction and problems associated with solids feeding across a large pressure barrier. Catalytic fast pyrolysis in a low pressure hydrogen atmosphere or RCFP, aims to achieve the same bio-crude yields and quality as hydropyrolysis but at low total pressure thus decreasing capital costs and problems associated with feeding at pressure. RCFP has shown to produce good bio-crude yields with good deoxygenation that are better than current catalytic fast pyrolysis technology but not quite as good as the hydropyrolysis technology.

Competitive Advantages

Feed prep and handling costs are much lower in the disclosed technology compared with numerous and various biomass preparation steps/options in KiOR process or with the challenges of feeding solids across pressure barrier as required in standard hydropyrolysis processes. While the bio-crude physical and chemical properties are difficult to directly compare, the thermal stability of bio-crude described here is such that >80% revaporizes at an oxygen content of 20 wt % at 350° C.; almost twice as much compared to bio-oil (non-catalytic). See plot below.

FIG. 6 shows the revaporization efficiency at 350° C. for bio-crudes with varying oxygen contents.

One non-limiting application of the invention is utilizing hydrogen and platinized catalysts in catalytic fast pyrolysis would be similar to that described in PCT/WO13/29379. However it is reasonable to expect that this technology could be applied to competing processes. In KiOR's processes, the platinized catalyst is likely a suitable replacement for the zeolite catalyst in the biomass catalytic cracking step and hydrogen would need to replace the inert nitrogen carrier. Similarly the platinized catalysts could replace sand in Ensyn's RTP technology and hydrogen would need to replace the nitrogen.

7. REFERENCES

1. Zabeti, M., et al., *In situ catalytic pyrolysis of lignocellulose using alkali-modified amorphous silica alumina.* Bioresource Technology, 2012. 118: p. 374-381.
2. Wang, Y. X., et al., *From biomass to advanced bio-fuel by catalytic pyrolysis/hydro-processing: Hydrodeoxygenation of bio-oil derived from biomass catalytic pyrolysis.* Bioresource Technology, 2012. 108: p. 280-284.
3. Thangalazhy-Gopakumar, S., S. Adhikari, and R. B. Gupta, *Catalytic Pyrolysis of Biomass over H(+)ZSM-5 under Hydrogen Pressure.* Energy & Fuels, 2012. 26(8): p. 5300-5306.
4. Sanna, A. and J. M. Andresen, *Bio-oil Deoxygenation by Catalytic Pyrolysis: New Catalysts for the Conversion of Biomass into Densified and Deoxygenated Bio-oil.* Chemsuschem, 2012. 5(10): p. 1944-1957.
5. Mettler, M. S., D. G. Vlachos, and P. J. Dauenhauer, *Top ten fundamental challenges of biomass pyrolysis for biofuels.* Energy & Environmental Science, 2012. 5(7): p. 7797-7809.
6. Jahirul, M. I., et al., *Biofuels Production through Biomass Pyrolysis-A Technological Review.* Energies, 2012. 5(12): p. 4952-5001.
7. Isahak, W., et al., *A review on bio-oil production from biomass by using pyrolysis method.* Renewable & Sustainable Energy Reviews, 2012. 16(8): p. 5910-5923.
8. Iliopoulou, E. F., et al., *Catalytic upgrading of biomass pyrolysis vapors using transition metal-modified ZSM-5 zeolite.* Applied Catalysis B-Environmental, 2012. 127: p. 281-290.
9. Gungor, A., et al., *Comparison between the "one-step" and "two-step" catalytic pyrolysis of pine bark.* Journal Of Analytical And Applied Pyrolysis, 2012. 97: p. 39-48.
10. Bridgwater, A. V., *Review of fast pyrolysis of biomass and product upgrading.* Biomass & Bioenergy, 2012. 38: p. 68-94.
11. Bertero, M., G. de la Puente, and U. Sedran, *Fuels from bio-oils: Bio-oil production from different residual sources, characterization and thermal conditioning.* Fuel, 2012. 95(1): p. 263-271.
12. Ardiyanti, A. R., et al., *Catalytic hydrotreatment of fast-pyrolysis oil using non-sulfided bimetallic Ni—Cu catalysts on a delta-Al2O3 support.* Applied Catalysis B-Environmental, 2012. 117: p. 105-117.
13. Mullen, C. A., et al., *Catalytic Fast Pyrolysis of White Oak Wood in a Bubbling Fluidized Bed.* Energy & Fuels, 2011. 25(11): p. 5444-5451.

14. Agrawal, R. and N. R. Singh, *Synergistic Routes to Liquid Fuel for a Petroleum-Deprived Future*. Aiche Journal, 2009. 55(7): p. 1898-1905.
15. Guell, A. J., et al., *EFFECT OF H2-PRESSURE ON THE STRUCTURES OF BIO-OILS FROM THE MILD HYDROPYROLYSIS OF BIOMASS*. Biomass & Bioenergy, 1993. 5(2): p. 155-171.
16. Marker, T. L., et al., *Integrated Hydropyrolysis and Hydroconversion (IH2) for the Direct Production of Gasoline and Diesel Fuels or Blending Components from Biomass, Part 1: Proof of Principle Testing*. Environmental Progress & Sustainable Energy, 2012. 31(2): p. 191-199.
17. Pindoria, R. V., et al., *A two-stage fixed-bed reactor for direct hydrotreatment of volatiles from the hydropyrolysis of biomass: effect of catalyst temperature, pressure and catalyst ageing time on product characteristics*. Fuel, 1998. 77(15): p. 1715-1726.
18. Rocha, J. D., C. A. Luengo, and C. E. Snape, *The scope for generating bio-oils with relatively low oxygen contents via hydropyrolysis*. Organic Geochemistry, 1999. 30(12): p. 1527-1534.
19. Furimsky, E., *Catalytic hydrodeoxygenation*. Applied Catalysis A-General, 2000. 199(2): p. 147-190.
20. Elliott, D. C., *Historical developments in hydroprocessing bio-oils*. Energy & Fuels, 2007. 21(3): p. 1792-1815.
21. Donnis, B., et al., *Hydroprocessing of Bio-Oils and Oxygenates to Hydrocarbons. Understanding the Reaction Routes*. Topics in Catalysis, 2009. 52(3): p. 229-240.
22. Mortensen, P. M., et al., *A review of catalytic upgrading of bio-oil to engine fuels*. Applied Catalysis A-General, 2011. 407(1-2): p. 1-19.
23. Oyama, S. T., et al., *Hydrodeoxygenation of a biofuel model compound (2-methyltetrahydrofuran) on transition metal phosphides*. Abstracts Of Papers Of The American Chemical Society, 2011. 242.
24. Oyama, S. T., et al., *Active phase of Ni2P/SiO2 in hydroprocessing reactions*. Journal of Catalysis, 2004. 221(2): p. 263-273.
25. Zhao, H. Y., et al., *Hydrodeoxygenation of guaiacol as model compound for pyrolysis oil on transition metal phosphide hydroprocessing catalysts*. Applied Catalysis A-General, 2011. 391(1-2): p. 305-310.
26. Do, P. T. M., et al., *Bimetallic effects in the hydrodeoxygenation of meta-cresol on gamma-Al2O3 supported Pt—Ni and Pt—Co catalysts*. Green Chemistry, 2012. 14(5): p. 1388-1397.
27. Foster, A. J., P. T. M. Do, and R. F. Lobo, *The Synergy of the Support Acid Function and the Metal Function in the Catalytic Hydrodeoxygenation of m-Cresol*. Topics in Catalysis, 2012. 55(3-4): p. 118-128.
28. Foster, A. J., et al., *Optimizing the aromatic yield and distribution from catalytic fast pyrolysis of biomass over ZSM-5*. Applied Catalysis A-General, 2012. 423: p. 154-161.

It is to be understood that, while the invention has been described in conjunction with the detailed description, thereof, the foregoing description is intended to illustrate and not limit the scope of the invention. Other aspects, advantages, and modifications of the invention are within the scope of the claims set forth below. All publications, patents, and patent applications cited in this specification are herein incorporated by reference as if each individual publication or patent application was specifically and individually indicated to be incorporated by reference.

What is claimed is:

1. An integrated reactive catalytic biomass pyrolysis process comprising reacting in a single primary catalytic reactor
   (i) a biomass starting material with a moisture content of 15% of less by mass under pyrolysis conditions in the presence of
   (ii) a hydrodeoxygenation (HDO) catalyst added in direct contact with the biomass in the primary catalytic reactor and
   (iii) an external hydrogen gas feed to the single primary catalytic reactor of about 10 volume % to about 90 volume % hydrogen gas at a pressure of less than about 6 bar to form a stream comprising a pyrolysis product comprising a bio-oil.

2. The process of claim 1, further comprising a step wherein the gas feed to the primary catalytic reactor contains hydrogen generated from methane.

3. The process of claim 1, wherein the pyrolysis product comprises a hydrogen-containing pyrolysis gases and hydrogen from the hydrogen-containing pyrolysis gases is recycled so as to contribute to the gas feed to the primary catalytic reactor.

4. The process of claim 1, wherein the gas feed to the primary catalytic reactor is about 30 volume % to about 90 volume % hydrogen gas.

5. The process of claim 1, wherein the gas feed to the primary catalytic reactor also contains carbon monoxide, carbon dioxide, nitrogen, alkanes, alkenes, helium, argon, hydrogen-containing pyrolysis gases or a mixture thereof.

6. The process of claim 1, wherein the biomass starting material comprises a lignocellulosic material.

7. The process of claim 1, wherein the biomass starting material is an agricultural residue, forest residues, a paper sludge, waste paper, or a municipal solid waste.

8. The process of claim 1, wherein the catalyst comprises a metal or metal oxide on an acidic support and the metal or metal oxide is tungsten, molybdenum, chromium, iron, ruthenium, cobalt, iridium, nickel, palladium, platinum, copper, silver, gold, tin, an oxide thereof, or a combination thereof.

9. The process of claim 8 wherein, the acidic support is silica, alumina, zirconia, tungstated zirconia, sulfated zirconia, titania, ceria, a zeolite or a combination thereof.

10. The process of claim 1, wherein said reacting is carried out at a temperature of about 200° C. to about 700° C.

11. The process of claim 1, wherein the catalyst and the biomass starting material in the primary catalytic reactor are provided in a ratio of about 1:10 to about 1000:1 based on mass.

12. The process of claim 1, wherein said reacting is carried out at ambient pressure.

13. The process of claim 1, further comprising: transferring the pyrolysis product stream to a separator; separating a vapor and gas fraction from a solids fraction comprising pyrolysis product solids and the catalyst; and regenerating and recycling the catalyst into the pyrolysis process.

14. The process of claim 13, wherein the vapor and gas fraction is transferred to a condenser wherein a liquid product is separated from a gaseous fraction.

15. The process of claim 1, further comprising isolating a bio-oil fraction from the pyrolysis product.

16. The process of claim 1, wherein the hydrodeoxygenation catalyst is a reduced metal oxide catalyst.

17. The process of claim 1, wherein the external hydrogen gas feed to the primary catalytic reactor is about 50 volume % to about 90 volume % hydrogen gas.

18. The process of claim 1, wherein the bio-oil has an oxygen content of 5% to 15% weight percent.

19. The process of claim 1, wherein the bio-oil has an oxygen content of 5% to 15% weight percent and a carbon efficiency of 30% to 40% based on an amount of carbon in an input biomass compared to an amount of carbon recovered in the bio-oil.

* * * * *